(No Model.)
L. SHUSTER, Jr.
DEVICE FOR TEMPORARILY SEALING THE ENDS OF SOIL OR WASTE PIPES.
No. 416,276. Patented Dec. 3, 1889.
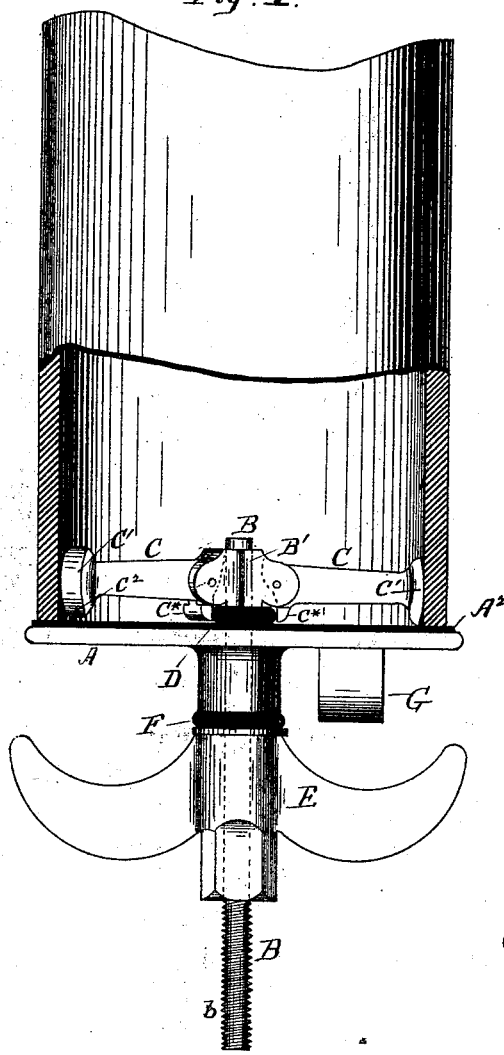
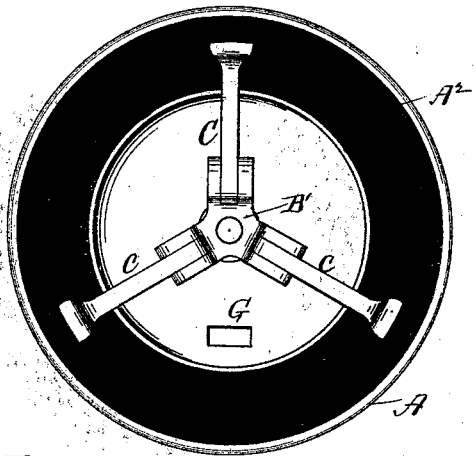
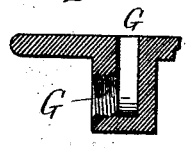
WITNESSES
INVENTOR

UNITED STATES PATENT OFFICE.

LAWRENCE SHUSTER, JR., OF PHILADELPHIA, PENNSYLVANIA.

DEVICE FOR TEMPORARILY SEALING THE ENDS OF SOIL OR WASTE PIPES.

SPECIFICATION forming part of Letters Patent No. 416,276, dated December 3, 1889.

Application filed March 18, 1889. Serial No. 303,698. (No model.)

*To all whom it may concern:*

Be it known that I, LAWRENCE SHUSTER, Jr., a citizen of the United States, residing at Philadelphia, in the county of Philadelphia and State of Pennsylvania, have invented certain new and useful Improvements in Devices for Temporarily Sealing the Ends of Soil or Waste Pipes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to devices for temporarily stopping up the ends of soil or waste pipes when testing them under pressure, and has for its object the provision of a device which will hermetically seal the pipe by being applied directly to the end thereof, while it is clamped to the pipe by means of toggles inside of the sealing-head, and the provision of means for introducing air through the said head.

The invention consists in the construction and combination of parts hereinafter set forth, and pointed out in the claims.

The accompanying drawings illustrate the invention.

Figure 1 is a side elevation of the pipe, partly broken away, showing my device applied. Fig. 2 is a plan view of the device removed. Fig. 3 is a sectional detail through the opening in the head-plate.

Similar letters of reference indicate corresponding parts in all the figures where they occur.

A is a plate which is set over the mouth or end of the pipe to close it. Through the center of this plate an opening is made for the passage of the shaft B, the outer end of which is threaded, as shown at $b$, and the inner end bears a head B', to which is pivoted toggles C, whose heads C' meet the sides of the pipe and have capacity for yielding slightly by reason of the rubber washer D, against which projections C* of the toggles press when the heads strike against the walls of the pipe. The heads are formed so that one end $C^2$ of their faces meets the walls of the pipe first. The face of the plate A, which meets the end of the pipe, is provided with a rubber washer $A^2$, which makes a hermetic joint upon the end of the pipe. The threaded end of the shaft B is provided with a butterfly-nut E threaded upon it, which is screwed down to compress the plate A upon the end of the pipe and to tighten the toggles in the pipe, so that the greater the compression upon the plate A the tighter the toggles grip the walls of the pipe. Between the nut E and head A is provided a rubber washer F, which seals the passage through which the shaft passes. The washer D, under the head B', also serves to seal this passage when the head is drawn up against the plate A.

G is a passage-way through the plate A, to which a hose or other pipe may be connected, to permit the introduction of air or other liquid under pressure for testing or for any other purpose. When it is desired to simply stop the end of the pipe, a screw-plug may be inserted in opening G to close it.

In place of the screw-nut E on the shaft B, a cam may be used, said cam being secured either upon the shaft B or plate A. If secured to the plate A, a stop against which it operates must be placed on the shaft B. The same result can also be accomplished by making a slot in the shaft B and inserting a wedge.

Having thus described my invention, what I claim, and desire to secure by Letters Patent, is—

1. A stopper for the ends of pipes, consisting of a plate A, a shaft B, passed through the plate, and toggles C on one end of the shaft and a nut E on the other, constructed and combined for operation, substantially as set forth.

2. The combination of the plate A, shaft B, passing therethrough, a head B' on one end of the shaft B, toggles C, pivoted to the said head, a yielding washer against which the toggles press at their inner ends when pressure is applied to the plate, and a nut on the outer end of the shaft, as set forth.

3. A stopper for the ends of pipes, consisting of plate A, having a passage G through it, and a shaft with toggles at one end and a nut at the other to hold the plate clamped upon the end of a pipe, as set forth.

4. A stopper for the ends of pipes, consisting of a plate A, a shaft B, passing through the plate A, and toggles C on one end of the shaft B, the opposite end being provided with means for operating said shaft and holding the plate A clamped upon the end of the pipe, substantially as set forth.

In testimony whereof I affix my signature in presence of two witnesses.

LAWRENCE SHUSTER, Jr.

Witnesses:
    Thos. D. Mowlds,
    Geo. H. Rapson.